US012606665B2

(12) United States Patent (10) Patent No.: US 12,606,665 B2
Gu et al. (45) Date of Patent: Apr. 21, 2026

(54) ELECTRONIC DEVICES AND POLYMER BLENDS FOR HIGH FREQUENCY APPLICATIONS

(71) Applicant: Avient Corporation, Avon Lake, OH (US)

(72) Inventors: Jiren Gu, Crystal Lake, IL (US); Hochul Jung, Algonquin, IL (US)

(73) Assignee: Avient Corporation, Avon Lake, OH (US)

( * ) Notice: Subject to any disclaimer, the term of this patent is extended or adjusted under 35 U.S.C. 154(b) by 23 days.

(21) Appl. No.: 18/557,812

(22) PCT Filed: Apr. 28, 2022

(86) PCT No.: PCT/US2022/026690
§ 371 (c)(1),
(2) Date: Oct. 27, 2023

(87) PCT Pub. No.: WO2022/232369
PCT Pub. Date: Nov. 3, 2022

(65) Prior Publication Data
US 2024/0218110 A1 Jul. 4, 2024

Related U.S. Application Data

(60) Provisional application No. 63/182,045, filed on Apr. 30, 2021.

(51) Int. Cl.
| | |
|---|---|
| *C08G 18/48* | (2006.01) |
| *C08G 18/10* | (2006.01) |
| *C08G 81/00* | (2006.01) |
| *C08K 7/28* | (2006.01) |
| *C08L 23/06* | (2006.01) |
| *C08L 23/12* | (2006.01) |
| *C08L 53/02* | (2006.01) |
| *C08L 75/08* | (2006.01) |

(52) U.S. Cl.
CPC ......... *C08G 18/4879* (2013.01); *C08G 18/10* (2013.01); *C08G 81/00* (2013.01); *C08K 7/28* (2013.01); *C08L 23/06* (2013.01); *C08L 23/12* (2013.01); *C08L 53/02* (2013.01); *C08L 75/08* (2013.01); *C08L 2203/20* (2013.01); *C08L 2205/035* (2013.01); *C08L 2207/04* (2013.01); *C08L 2207/20* (2013.01)

(58) Field of Classification Search
None
See application file for complete search history.

(56) References Cited

U.S. PATENT DOCUMENTS

| | | | | |
|---|---|---|---|---|
| 6,054,533 | A | * | 4/2000 | Farkas .................. C08G 18/10 |
| | | | | 525/89 |
| 2013/0338279 | A1 | | 12/2013 | Vanhalle et al. |
| 2017/0233572 | A1 | | 8/2017 | Boucard et al. |
| 2019/0160332 | A1 | | 5/2019 | Beer et al. |
| 2021/0083708 | A1 | * | 3/2021 | Sugumaar .............. C08L 33/08 |

FOREIGN PATENT DOCUMENTS

| | | | | |
|---|---|---|---|---|
| CN | 101959920 | A | 2/2016 | |
| CN | 111138815 | A | 5/2020 | |
| EP | 0390148 | A2 * | 2/1990 | |
| EP | 3620478 | A1 * | 3/2020 | ......... C08G 18/7671 |
| EP | 3689970 | A1 | 12/2021 | |
| JP | 2017078131 | A * | 4/2017 | |
| KR | 102104753 | B1 | 4/2020 | |
| WO | WO-2020024242 | A1 * | 2/2020 | ............ B29B 11/06 |
| WO | 2022232369 | A1 | 11/2022 | |

OTHER PUBLICATIONS

JP 2017-078131A, 2018, Machine translation (Year: 2017).*
Fang et al., Enhanced Sound Insulationand Mechanical Properties Based on Inorganic Fillers/Thermoplastic Elastomer Composites, 2018 pp. 1-14, Journal of Thermoplastic Composite Materials.
Lu et al., Mechanical, Thermal and Rheological Properties of Hollow Glass Microsphere Filled Thermoplastic Polyurethane Composites Blended By Normal Vane Extruder, Plastics, Rubber and Composites, 2015, pp. 306-313, vol. 44, No. 8, Institute of Materials, Minerals and Mining.

* cited by examiner

*Primary Examiner* — Satya B Sastri
(74) *Attorney, Agent, or Firm* — Calfee, Halter & Griswold LLP

(57) ABSTRACT

Embodiments of the present disclosure are directed to electronic devices comprising a housing comprising a polymer blend. The polymer blend comprises at least one of an aromatic polyether thermoplastic polyurethane and a copolyester elastomer, and a dielectric constant modifier comprising at least one of a polyolefin and a block copolymer comprising at least one polyolefin block. The electronic devices receive signals greater than or equal to 2.5 Gigahertz.

16 Claims, No Drawings

ELECTRONIC DEVICES AND POLYMER BLENDS FOR HIGH FREQUENCY APPLICATIONS

CLAIM OF PRIORITY

This application claims the benefit of U.S. Provisional Patent Application Ser. No. 63/182,045 and filed on Apr. 30, 2021, which is hereby incorporated by reference in its entirety.

TECHNICAL FIELD

Embodiments of the present disclosure are generally related to electronic devices and polymer blends, and are specifically related to electronic devices and polymer blends having a reduced dielectric constant.

BACKGROUND

Thermoplastic elastomers, such as thermoplastic polyurethane (TPU) and copolyester elastomer (COPE), are widely used in many electronic devices due to their hardness and tensile strength. However, the high dielectric constant (e.g., greater than or equal to 3.25) of TPU and COPE may not be suitable for use in electronic devices transmitting and/or receiving high frequency (e.g., greater than or equal to 2.5 Gigahertz (GHz)). For instance, the presence of TPU or COPE in electronic devices may disrupt connections that occur at the higher wavelength frequencies of fifth generation (5G), which may cause dropped calls, signal loss, and slow data transmission.

Accordingly, a need exists for improved polymer blends that minimize disruption of transmitting and/or receiving of high frequency while providing the performance necessary for use in electronic devices (e.g., hardness and tensile strength).

SUMMARY

Embodiments of the present disclosure are directed to electronic devices having a housing formed from polymer blends of at least one of an aromatic polyether thermoplastic polyurethane (TPU) and a copolyester elastomer (COPE) and a dielectric constant modifier, which have a reduced dielectric constant to minimize degradation of high frequency and exhibit sufficient hardness and tensile strength.

According to one embodiment, an electronic device is provided. The electronic device comprises a housing comprising a polymer blend. The polymer blend comprises at least one of an aromatic polyether thermoplastic polyurethane (TPU) and a copolyester elastomer (COPE), and a dielectric constant modifier comprising at least one of a polyolefin and a block copolymer comprising at least one polyolefin block. The electronic device receives signals greater than or equal to 2.5 GHz.

According to another embodiment, a polymer blend is provided. The polymer blend comprises 45 weight percent (wt %) to 95 wt % of at least one of the aromatic polyether thermoplastic polyurethane (TPU) and the copolyester elastomer (COPE), and 1 wt % to 50 wt % of the dielectric constant modifier comprising at least one of a polyolefin and a block copolymer comprising at least one polyolefin block.

Additional features and advantages of the embodiments described herein will be set forth in the detailed description which follows, and in part will be readily apparent to those skilled in the art from that description or recognized by practicing the embodiments described herein, including the detailed description, which follows and the claims.

DETAILED DESCRIPTION

Reference will now be made in detail to various embodiments of electronic devices, specifically electronic devices transmitting and/or receiving signals greater than or equal to 2.5 GHz. The electronic devices comprise a housing comprising a polymer blend. The polymer blend comprises at least one of an aromatic polyether TPU and a COPE, and a dielectric constant modifier comprising at least one of a polyolefin and a block copolymer comprising at least one polyolefin block.

The disclosure should not be construed as limited to the embodiments set forth herein. Rather, these embodiments are provided so that this disclosure will be thorough and complete, and will fully convey the subject matter to those skilled in the art.

Definitions

Unless otherwise defined, all technical and scientific terms used herein have the same meaning as commonly understood by one of ordinary skill in the art. The terminology used in the disclosure herein is for describing particular embodiments only and is not intended to be limiting.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used in the specification and the appended claims, the singular forms "a," "an," and "the" are intended to include the plural forms as well, unless the context clearly indicates otherwise. Thus, for example, reference to "a" component includes aspects having two or more such components, unless the context clearly indicates otherwise.

The terms "0 wt %," when used to describe the weight and/or absence of a particular component in a polymer blend means that the component is not intentionally added to the polymer blend. However, the polymer blend may contain traces of the component as a contaminant or tramp in amounts less than 0.05 wt %.

The term "wt %," as described herein, refers to wt % based on the weight of the polymer blend, unless otherwise noted.

The term "blend," as described herein, refers to a composition or mixture resulting from melt mixing, or compounding, a neat polymer and at least one other ingredient including but not limited to one or more additives, or one or more other polymers, or both.

The term "Shore A hardness," as described herein, refers to the hardness of a material as measured according to ASTM D2240.

The term "specific gravity," as described herein, refers to the ratio of the density of a material to the density of water and is measured according to ASTM D792 at 23° C.

The term "density," as described herein, refers to the mass per unit volume of a substance as measured according to ASTM D792 at 23° C.

The term "tensile elongation at break," as described herein, refers to the ratio between increased length and initial length after breakage as measured according to ASTM D412, Die C.

The term "tensile strength at break," as described herein, refers to the maximum stress that a material can withstand while stretching before breaking as measured according to ASTM D412, Die C.

The term "dielectric constant," as described herein, refers to the dielectric constant of a material as measured according to a resonant cavity method with a frequency of 2.5 GHz.

The term "dissipation factor," as described herein, refers to the dissipation factor of a material as measured according to a resonant cavity method with a frequency of 2.5 GHz.

The term "sufficient hardness and tensile strength," as described herein, refers to Shore A hardness from 50 to 92, and tensile strength of higher than 50% of a neat polymer of corresponding hardness.

As discussed hereinabove, thermoplastic elastomer blends including TPU and/or COPE are commonly used in many electronic device applications, such as protective cases and other components or accessories for personal devices, because TPU and COPE provide sufficient hardness and tensile strength necessary for these applications. However, TPU and COPE may have a relatively high dielectric constant, which may degrade high frequency. Accordingly, TPU and/or COPE having a relatively high dielectric constant may not be suitable for use in electronic devices transmitting and/or receiving high frequency, such as 5G applications.

Disclosed herein are polymer blends and electronic devices including a housing made therefrom which mitigate the aforementioned problems. Specifically, the polymer blends disclosed herein comprise at least one of an aromatic polyether thermoplastic polyurethane (TPU) and a copolyester elastomer (COPE), and a dielectric constant modifier comprising at least one of a polyolefin and a block copolymer comprising at least one polyolefin block, which results in a polymer blend having a reduced dielectric constant that minimizes degradation of high frequency as compared to a conventional thermoplastic elastomer blend including TPU and/or COPE and sufficient hardness and tensile strength. The dielectric constant modifier described herein may be dispersed within the at least one of the aromatic polyether TPU and the COPE to decrease the dielectric constant of the at least one of the aromatic polyether TPU and the COPE, thereby minimizing the degradation of high frequency while providing sufficient hardness and tensile strength.

The polymer blends disclosed herein may generally be described as comprising the at least one of the aromatic polyether TPU and the COPE and the dielectric constant modifier. The dielectric constant modifier may comprise at least one of a polyolefin and a block copolymer comprising at least one polyolefin block.

Primary Polymer

As described hereinabove, the polymer blend comprises a primary polymer comprising at least one of the aromatic polyether TPU and COPE. The primary polymer imparts a desired hardness and tensile strength to the polymer blend required for electronic devices transmitting and/or receiving high frequency. The primary polymer may come from a recycled source.

In embodiments, the polymer blend may comprise aromatic polyether TPU. In embodiments, the polymer blend may comprise COPE. In embodiments, the polymer blend may comprise both aromatic polyether TPU and COPE.

Various aromatic polyether TPU are considered suitable for the present polymer blends. The term "aromatic," as described herein, refers to TPU derived from mononuclear aromatic hydrocarbon groups or polynuclear aromatic hydrocarbon groups. The term "aromatic polyether thermoplastic polyurethane," as described herein, refers to a type of thermoplastic polyurethane that is a reaction product of reactants including a polyether polyol and an aromatic diisocyanate and, optionally, chain extender.

In embodiments, the dielectric constant (Dk) of the aromatic polyether TPU may be less than or equal to 3.25, less than or equal to 3.2, less than or equal to 3.15, less than or equal to 3.1, less than or equal to 3.05, less than or equal to 3.0, less than or equal to 2.95, less than or equal to 2.9, less than or equal to 2.85, less than or equal to 2.8, less than or equal to 2.75, or even less than or equal to 2.7, as measured in accordance with a resonant cavity method with a frequency of 2.5 GHz. In embodiments, the Dk of the aromatic polyether TPU may be greater than or equal to 0.1, greater than or equal to 0.5, greater than or equal to 1.0, greater than or equal to 1.5, or even greater than or equal to 2.0, as measured in accordance with a resonant cavity method with a frequency of 2.5 GHz. In embodiments, the Dk of the aromatic polyether TPU may be from 0.1 to 3.25, from 0.1 to 3.2, from 0.1 to 3.15, from 0.1 to 3.1, from 0.1 to 3.05, from 0.1 to 3.0, from 0.1 to 2.95, from 0.1 to 2.9, from 0.1 to 2.85, from 0.1 to 2.8, from 0.1 to 2.75, from 0.1 to 2.7, from 0.5 to 3.25, from 0.5 to 3.2, from 0.5 to 3.15, from 0.5 to 3.1, from 0.5 to 3.05, from 0.5 to 3.0, from 0.5 to 2.95, from 0.5 to 2.9, from 0.5 to 2.85, from 0.5 to 2.8, from 0.5 to 2.75, from 0.5 to 2.7, from 1.0 to 3.25, from 1.0 to 3.2, from 1.0 to 3.15, from 1.0 to 3.1, from 1.0 to 3.05, from 1.0 to 3.0, from 1.0 to 2.95, from 1.0 to 2.9, from 1.0 to 2.85, from 1.0 to 2.8, from 1.0 to 2.75, from 1.0 to 2.7, from 1.5 to 3.25, from 1.5 to 3.2, from 1.5 to 3.15, from 1.5 to 3.1, from 1.5 to 3.05, from 1.5 to 3.0, from 1.5 to 2.95, from 1.5 to 2.9, from 1.5 to 2.85, from 1.5 to 2.8, from 1.5 to 2.75, from 1.5 to 2.7, from 2.0 to 3.25, from 2.0 to 3.2, from 2.0 to 3.15, from 2.0 to 3.1, from 2.0 to 3.05, from 2.0 to 3.0, from 2.0 to 2.95, from 2.0 to 2.9, from 2.0 to 2.85, from 2.0 to 2.8, from 2.0 to 2.75, or even from 2.0 to 2.7, or any and all sub-ranges formed from any of these endpoints, as measured in accordance with a resonant cavity method with a frequency of 2.5 GHz.

In embodiments, the dissipation factor (Df) of the aromatic polyether TPU may be less than or equal to 1.0, less than or equal to 0.095, less than or equal to 0.09, less than or equal to 0.085, or even less than or equal to 0.08, as measured in accordance with a resonant cavity method with a frequency of 2.5 GHz. In embodiments, the Df of the aromatic polyether TPU may be greater than or equal to 0.001, greater than or equal to 0.005, greater than or equal to 0.01, greater than or equal to 0.02, or even greater than or equal to 0.03, as measured in accordance with a resonant cavity method with a frequency of 2.5 GHz. In embodiments, the Df of the aromatic polyether TPU may be from 0.001 to 1.0, from 0.001 to 0.095, from 0.001 to 0.09, from 0.001 to 0.085, from 0.001 to 0.08, from 0.005 to 1.0, from 0.005 to 0.095, from 0.005 to 0.09, from 0.005 to 0.085, from 0.005 to 0.08, from 0.01 to 1.0, from 0.01 to 0.095, from 0.01 to 0.09, from 0.01 to 0.085, from 0.01 to 0.08, from 0.02 to 1.0, from 0.02 to 0.095, from 0.02 to 0.09, from 0.02 to 0.085, from 0.02 to 0.08, from 0.03 to 1.0, from 0.03 to 0.095, from 0.03 to 0.09, from 0.03 to 0.085, or even from 0.03 to 0.08, or any and all sub-ranges formed from any of these endpoints, as measured in accordance with a resonant cavity method with a frequency of 2.5 GHz.

In embodiments, the aromatic polyether TPU may have a Shore A hardness less than or equal to 100, less than or equal to 95, or even less than or equal to 90. In embodiments, the aromatic polyether TPU may have a Shore A hardness greater than or equal to 10, greater than or equal to 20, or even greater than or equal to 30. In embodiments, the aromatic polyether TPU may have a Shore A hardness from 10 to 100, from 10 to 95, from 10 to 90, from 20 to 100, from 20 to 95, from 20 to 90, from 30 to 100, from 30 to 95, or even from 30 to 90, or any and all sub-ranges formed from any of these endpoints.

In embodiments, the aromatic polyether TPU may have a tensile elongation at break greater than or equal to 400 percentage (%) or even greater than or equal to 500%. In embodiments, the aromatic polyether TPU may have a tensile elongation at break less than or equal to 1000%, less than or equal to 900%, or even less than or equal to 800%. In embodiments, the aromatic polyether TPU may have a tensile elongation at break from 400% to 1000%, from 400% to 900%, from 400% to 800%, from 500% to 1000%, from 500% to 900%, or even from 500% to 800%, or any and all sub-ranges formed from any of these endpoints.

In embodiments, the aromatic polyether TPU may have a tensile strength at break greater than or equal to 10 megapascal (MPa), greater than or equal to 15 MPa, or even greater than or equal to 20 MPa. In embodiments, the aromatic polyether TPU may have a tensile strength at break less than or equal to 100 MPa, less than or equal to 90 MPa, or even less than or equal to 80 MPa. In embodiments, the aromatic polyether TPU may have a tensile strength at break from 10 MPa to 100 MPa, from 10 MPa to 90 MPa, from 10 MPa to 80 MPa, from 15 MPa to 100 MPa, from 15 MPa to 90 MPa, from 15 MPa to 80 MPa, from 20 MPa to 100 MPa, from 20 MPa to 90 MPa, or even from 20 MPa to 80 MPa, or any and all sub-ranges formed from any of these endpoints.

In embodiments, the aromatic polyether TPU may have a density greater than or equal to 0.8 gram per cubic centimeter (g/cm$^3$), greater than or equal to 0.9 g/cm$^3$, or even greater than or equal to 1.0 g/cm$^3$. In embodiments, the aromatic polyether TPU may have a density less than or equal to 1.5 g/cm$^3$, less than or equal to 1.4 g/cm$^3$, or even less than or equal to 1.3 g/cm$^3$. In embodiments, the aromatic polyether TPU may have a density from 0.8 g/cm$^3$ to 1.5 g/cm$^3$, from 0.8 g/cm$^3$ to 1.4 g/cm$^3$, from 0.8 g/cm$^3$ to 1.3 g/cm$^3$, from 0.9 g/cm$^3$ to 1.5 g/cm$^3$, from 0.9 g/cm$^3$ to 1.4 g/cm$^3$, from 0.9 g/cm$^3$ to 1.3 g/cm$^3$, from 1.0 g/cm$^3$ to 1.5 g/cm$^3$, from 1.0 g/cm$^3$ to 1.4 g/cm$^3$, or even from 1.0 g/cm$^3$ to 1.3 g/cm$^3$, or any and all sub-ranges formed from any of these endpoints.

Suitable commercial embodiments of the aromatic polyether TPU are available under the IROGRAN brand, such as grade A 85 P 4394 UV, available from Huntsman.

Various COPE are considered suitable for the present polymer blends. In embodiments, the COPE includes block copolymers composed from repeating soft segments of aliphatic polyether or aliphatic polyester and hard segments of aromatic polyester.

Suitable commercial embodiments of the COPE are available under the Hytrel brand, available from DuPont; the Amite brand, available from DSM; the Skypel brand, available from SK Chemicals.

In embodiments, the amount of the at least one of the aromatic polyether TPU and COPE in the polymer blend may be less than or equal to 95 wt %, less than or equal to 90 wt %, less than or equal to 85 wt %, or even less than or equal to 80 wt %. In embodiments, the amount of the at least one of the aromatic polyether TPU and COPE in the polymer blend may be greater than or equal to 45 wt %, greater than or equal to 50 wt %, or even greater than or equal to 55 wt %. In embodiments, the amount of the at least one of the aromatic polyether TPU and COPE in the polymer blend may be from 45 wt % to 95 wt %, from 45 wt % to 90 wt %, from 45 wt % to 85 wt %, from 45 wt % to 80 wt %, from 50 wt % to 95 wt %, from 50 wt % to 90 wt %, from 50 wt % to 85 wt %, from 50 wt % to 80 wt %, from 55 wt % to 95 wt %, from 55 wt % to 90 wt %, from 55 wt % to 85 wt %, or even from 55 wt % to 80 wt %, or any and all sub-ranges formed from any of these endpoints.

Dielectric Constant Modifier

As described hereinabove, the dielectric constant modifier imparts a desired Dk, to the polymer blend for use in electronic devices transmitting and/or receiving signals greater than or equal to 2.5 GHz. The dielectric constant modifier may also impart a desired Df to the polymer blend desired for electronic device applications, particularly for electronic devices transmitting and/or receiving signals greater than or equal to 2.5 GHz. The dielectric constant modifier may come from a recycled source.

Various dielectric constant modifiers are considered suitable for the present polymer blends. In embodiments, the dielectric constant modifier may comprise at least one of a polyolefin and a block copolymer comprising at least one polyolefin block.

In embodiments, the dielectric constant modifier may comprise polyolefin. In embodiments, the polyolefin may comprise at least one of polyethylene, and polypropylene. In embodiments, the polyolefin may comprise polyethylene. In embodiments, the polyolefin may comprise polypropylene. In embodiments, the polyolefin may comprise both polyethylene and polypropylene.

In embodiments, the polyethylene may comprise linear low-density polyethylene (LLDPE), low-density polyethylene (LDPE), medium-density polyethylene (MDPE), high-density polyethylene (HDPE), or combinations thereof. In embodiments, the polyethylene may comprise a polyethylene homopolymer (i.e., composed of ethylene monomers) or a polyethylene copolymer having greater than 30 wt % ethylene monomer and an additional comonomer, such as $C_3$-$C_{12}$ alpha olefins, ethylene-vinyl acetate (EVA), ethylene butyl acrylate (EBA), or ethyl methacrylate (EMA). In embodiments, the EVA may have a high proportion of vinyl acetate (e.g., greater than or equal to 60 wt %).

In embodiments, the polypropylene may comprise a polypropylene homopolymer (i.e., composed of propylene monomers) or a polypropylene copolymer having greater than 50 wt % propylene monomer and an additional comonomer such as $C_3$-$C_{12}$ alpha olefins.

Suitable commercial embodiments of the polyolefin are available under the AFFINITY, VERSIFY, or ENGAGE brand, available from Dow Chemicals.

In embodiments, the dielectric constant modifier may comprise a block copolymer. In embodiments, the block copolymer may comprise at least one polyolefin block. The term "polyolefin block," described herein, refers to a block composed of a polyolefin. The term "block" described herein, refers to a portion of a macromolecule, comprising many constitutional units, that has at least one feature which is not present in the adjacent portions In embodiments, the block copolymer may comprise a styrene-butadiene block copolymer (SBC). In embodiments, the SBC may comprise a styrene-ethylene/butylene-styrene block copolymer (SEBS), a styrene-(ethylene/propylene)-styrene block copolymer (SEEPS), a styrene isoprene block copolymer (SIS), a styrene-isobutylene-styrene block copolymer (SIBS), or combinations thereof. For example, in embodiments, the styrene copolymer may comprise a SEBS and a SEEPS, a SEBS and a SIS, a SEBS and a SIBS, a SEEPS and a SIS, a SEEPS and a SIBS, or even a SIS or a SIBS. In embodiments, the SBC may have a Dk of less than or equal to 3.0, less than or equal to 2.8, less than or equal to 2.6, less than or equal to 2.5, or even less than or equal to 2.4, as measured in accordance with a resonant cavity method with a frequency of 2.5 GHz. In embodiments, the SBC may have a Dk of greater than or equal to 0.1, greater than or equal to 0.5, greater than or equal to 1.0, greater than or equal to 1.5, or even greater than or equal to 2.0, as measured in accordance with a resonant cavity method with a frequency of 2.5 GHz. In embodiments, the Dk of the SBC may be from 0.1 to 3.0, from 0.1 to 2.95, from 0.1 to 2.9, from 0.1 to 2.85, from 0.1 to 2.8, from 0.1 to 2.75, from 0.1 to 2.7, from 0.5 to 3.0, from 0.5 to 2.95, from 0.5 to 2.9, from 0.5 to 2.85, from 0.5 to 2.8, from 0.5 to 2.75, from 0.5 to 2.7, from 1.0 to 3.0, from 1.0 to 2.95, from 1.0 to 2.9, from 1.0 to 2.85, from 1.0 to 2.8, from 1.0 to 2.75, from 1.0 to 2.7, from 1.5 to 3.0, from 1.5 to 2.95, from 1.5 to 2.9, from 1.5 to 2.85, from 1.5 to 2.8, from 1.5 to 2.75, from 1.5 to 2.7, from 2.0 to 3.0, from 2.0 to 2.95, from 2.0 to 2.9, from 2.0 to 2.85, from 2.0 to 2.8, from 2.0 to 2.75, or even from 2.0 to 2.7, or any and all sub-ranges formed from any of these endpoints, as measured in accordance with a resonant cavity method with a frequency of 2.5 GHz.

In embodiments, the SBC may have a Shore A hardness less than or equal to 100, less than or equal to 95, or even less than or equal to 90. In embodiments, the SBC may have a Shore A hardness greater than or equal to 10, greater than or equal to 20, or even greater than or equal to 30. In embodiments, the SBC may have a Shore A hardness from 10 to 100, from 10 to 95, from 10 to 90, from 20 to 100, from 20 to 95, from 20 to 90, from 30 to 100, from 30 to 95, or even from 30 to 90, or any and all sub-ranges formed from any of these endpoints.

In embodiments, the SBC may have a tensile elongation at break greater than or equal to 300%, greater than or equal to 400%, or even greater than or equal to 500%. In embodiments, the SBC may have a tensile elongation at break less than or equal to 1000%, less than or equal to 900%, or even less than or equal to 800%. In embodiments, the SBC may have a tensile elongation at break from 300% to 1000%, from 300% to 900%, from 300% to 800%, from 400% to 1000%, from 400% to 900%, from 400% to 800%, from 500% to 1000%, from 500% to 900%, or even from 500% to 800%, or any and all sub-ranges formed from any of these endpoints.

In embodiments, the SBC may have a tensile strength at break greater than or equal to 10 MPa, greater than or equal to 15 MPa, or even greater than or equal to 20 MPa. In embodiments, the SBC may have a tensile strength at break less than or equal to 100 MPa, less than or equal to 90 MPa, or even less than or equal to 80 MPa. In embodiments, the SBC may have a tensile strength at break from 10 MPa to 100 MPa, from 10 MPa to 90 MPa, from 10 MPa to 80 MPa, from 15 MPa to 100 MPa, from 15 MPa to 90 MPa, from 15 MPa to 80 MPa, from 20 MPa to 100 MPa, from 20 MPa to 90 MPa, or even from 20 MPa to 80 MPa, or any and all sub-ranges formed from any of these endpoints.

In embodiments, the SBC may have a specific gravity greater than or equal to 0.8, or even greater than or equal to 0.9. In embodiments, the SBC may have a specific gravity less than or equal to 1.5, less than or equal to 1.4, or even less than or equal to 1.3. In embodiments, the SBC may have a specific gravity from 0.8 to 1.5, from 0.8 to 1.4, from 0.8 to 1.3, from 0.9 to 1.5, from 0.9 to 1.4, or even from 0.9 to 1.3, or any and all sub-ranges formed from any of these endpoints.

Suitable commercial embodiments of the SEBS are available under the KRATON brand, available from Kraton Polymers.

Suitable commercial embodiments of the SEEPS are available under the SEPTON brand, available from Kuraray.

In embodiments, the dielectric constant modifier may further comprise a polyolefin elastomer, a thermoplastic vulcanizate (TPV), a silicone, or a combination thereof.

Various polyolefin elastomers are considered suitable for the present dielectric constant modifiers. In embodiments, the polyolefin elastomer may comprise propylene-based elastomers, ethylene/α-olefin random copolymers, and combinations thereof.

Suitable commercial embodiments of the polyolefin elastomer are available under the ENGAGE or INFUSE brand, available from Dow Chemicals.

In embodiments, the TPV may comprise blends of a continuous phase of a polyolefin such as polypropylene and a discontinuous phase of a vulcanized rubber such as cross-linked ethylene propylene diene monomer (EPDM).

Suitable commercial embodiments of the TPV are available under the Santoprene brand, available from ExxonMobil.

In embodiments, the silicone may comprise cross-linked and/or non-cross-linked silicone.

Suitable commercial embodiments of the silicone are available under the MB50 brand, available from Dow Corning.

In embodiments, the dielectric constant modifier is included in amounts of 1 wt % to 50 wt % such that the dielectric constant modifier may impart the desired dielectric constant to the at least one of the aromatic polyether TPU and the COPE.

In embodiments, the amount of dielectric constant modifier in the polymer blend may be less than or equal to 50 wt %, less than or equal to 45 wt %, less than or equal to 40 wt %, less than or equal to 35 wt %, or less than or equal to 30 wt %. In embodiments, the amount of dielectric constant modifier in the polymer blend may be greater than or equal to 1 wt %, greater than or equal to 2 wt %, or greater than or equal to 5 wt %. In embodiments, the amount of dielectric constant modifier in the polymer blend may be from 1 wt % to 50 wt %, from 1 wt % to 45 wt %, from 1 wt % to 40 wt %, from 1 wt % to 35 wt %, from 1 wt % to 30 wt %, from 2 wt % to 50 wt %, from 2 wt % to 45 wt %, from 2 wt % to 40 wt %, from 2 wt % to 35 wt %, from 2 wt % to 30 wt %, from 5 wt % to 50 wt %, from 5 wt % to 45 wt %, from 5 wt % to 40 wt %, from 5 wt % to 35 wt %, or even from 5 wt % to 30 wt %, or any and all sub-ranges formed from any of these endpoints.

Polymer Blend

As described herein, the polymer blends comprise the at least one of the aromatic polyether TPU and the COPE, and the dielectric constant modifier. While not wishing to be bound by theory, it is believed that the relatively low dielectric constant achieved by the polymer blends disclosed herein is due to the inclusion of the dielectric constant modifier. The low dielectric constant indicates an increase in the polymer blend's ability to minimize degradation of high frequency. The polymer blends disclosed herein meet the requirements of low dielectric constant and sufficient hardness and tensile strength for the intended application, such as a housing of an electronic device receiving signals greater than or equal to 2.5 GHz. The polymer blends disclosed herein may also have an abrasion resistance and a stain resistance required for the intended application.

In embodiments, the polymer blend may have a Dk of less than or equal to 3.25, less than or equal to 3.2, less than or equal to 3.15, less than or equal to 3.1, less than or equal to 3.05, less than or equal to 3.0, less than or equal to 2.95, less than or equal to 2.9, less than or equal to 2.85, less than or equal to 2.8, less than or equal to 2.75, or even less than or equal to 2.7, as measured in accordance with a resonant cavity method with a frequency of 2.5 GHz. In embodiments, the polymer blend may have a Dk of greater than or equal to 0.1, greater than or equal to 0.5, greater than or equal to 1.0, greater than or equal to 1.5, or even greater than or equal to 2.0, as measured in accordance with a resonant cavity method with a frequency of 2.5 GHz. In embodiments, the Dk of the polymer blend may be from 0.1 to 3.25, from 0.1 to 3.2, from 0.1 to 3.15, from 0.1 to 3.1, from 0.1 to 3.05, from 0.1 to 3.0, from 0.1 to 2.95, from 0.1 to 2.9, from 0.1 to 2.85, from 0.1 to 2.8, from 0.1 to 2.75, from 0.1 to 2.7, from 0.5 to 3.25, from 0.5 to 3.2, from 0.5 to 3.15, from 0.5 to 3.1, from 0.5 to 3.05, from 0.5 to 3.0, from 0.5 to 2.95, from 0.5 to 2.9, from 0.5 to 2.85, from 0.5 to 2.8, from 0.5 to 2.75, from 0.5 to 2.7, from 1.0 to 3.25, from 1.0 to 3.2, from 1.0 to 3.15, from 1.0 to 3.1, from 1.0 to 3.05, from 1.0 to 3.0, from 1.0 to 2.95, from 1.0 to 2.9, from 1.0 to 2.85, from 1.0 to 2.8, from 1.0 to 2.75, from 1.0 to 2.7, from 1.5 to 3.25, from 1.5 to 3.2, from 1.5 to 3.15, from 1.5 to 3.1, from 1.5 to 3.05, from 1.5 to 3.0, from 1.5 to 2.95, from 1.5 to 2.9, from 1.5 to 2.85, from 1.5 to 2.8, from 1.5 to 2.75, from 1.5 to 2.7, from 2.0 to 3.25, from 2.0 to 3.2, from 2.0 to 3.15, from 2.0 to 3.1, from 2.0 to 3.05, from 2.0 to 3.0, from 2.0 to 2.95, from 2.0 to 2.9, from 2.0 to 2.85, from 2.0 to 2.8, from 2.0 to 2.75, or even from 2.0 to 2.7, or any and all sub-ranges formed from any of these endpoints, as measured in accordance with a resonant cavity method with a frequency of 2.5 GHz.

In embodiments, the polymer blend may have a Df of less than or equal to 1.0, less than or equal to 0.095, less than or equal to 0.09, less than or equal to 0.085, or less even than or equal to 0.08, as measured in accordance with a resonant cavity method with a frequency of 2.5 GHz. In embodiments, the polymer blend may have a Df of greater than or equal to 0.001, greater than or equal to 0.005, greater than or equal to 0.01, greater than or equal to 0.02, or greater than or equal to 0.03, as measured in accordance with a resonant cavity method with a frequency of 2.5 GHz. In embodiments, the Df of the polymer blend may be from 0.001 to 1.0, from 0.001 to 0.095, from 0.001 to 0.09, from 0.001 to 0.085, from 0.001 to 0.08, from 0.005 to 1.0, from 0.005 to 0.095, from 0.005 to 0.09, from 0.005 to 0.085, from 0.005 to 0.08, from 0.01 to 1.0, from 0.01 to 0.095, from 0.01 to 0.09, from 0.01 to 0.085, from 0.01 to 0.08, from 0.02 to 1.0, from 0.02 to 0.095, from 0.02 to 0.09, from 0.02 to 0.085, from 0.02 to 0.08, from 0.03 to 1.0, from 0.03 to 0.095, from 0.03 to 0.09, from 0.03 to 0.085, or even from 0.03 to 0.08, or any and all sub-ranges formed from any of these endpoints as measured in accordance with a resonant cavity method with a frequency of 2.5 GHz.

In embodiments, the polymer blend may have a desired hardness and tensile strength required for electronic devices transmitting and/or receiving high frequency. In embodiments, the polymer blend may have a Shore A hardness less than or equal to 90, less than or equal to 85, less than or equal to 80, less than or equal to 75, or even less than or equal to 70. In embodiments, the polymer blend may have a Shore A hardness greater than or equal to 3, greater than or equal to 5, greater than or equal to 10, greater than or equal to 20, or even greater than or equal to 30. In embodiments, the polymer blend may have a Shore A hardness from 3 to 90, from 3 to 85, from 3 to 80, from 3 to 75, from 3 to 70, from 5 to 90, from 5 to 85, from 5 to 80, from 5 to 75, from 5 to 70, from 10 to 90, from 10 to 85, from 10 to 80, from 10 to 75, from 10 to 70, from 20 to 90, from 20 to 85, from 20 to 80, from 20 to 75, from 20 to 70, from 30 to 90, from 30 to 85, from 30 to 80, from 30 to 75, or even from 30 to 70, or any and all sub-ranges formed from any of these endpoints.

In embodiments, the polymer blend may have a specific gravity greater than or equal to 0.7, greater than or equal to 0.8, or even greater than or equal to 0.9. In embodiments, the polymer blend may have a specific gravity less than or equal to 1.3, less than or equal to 1.2, less than or equal to 1.1, or even less than or equal to 1.0. In embodiments, the polymer blend may have a specific gravity from 0.7 to 1.3, from 0.7 to 1.2, from 0.7 to 1.1, from 0.7 to 1.0, from 0.8 to 1.3, from 0.8 to 1.2, from 0.8 to 1.1, from 0.8 to 1.0, from 0.9 to 1.3, from 0.9 to 1.2, from 0.9 to 1.1, or even from 0.9 to 1.0, or any and all sub-ranges formed from any of these endpoints.

In embodiments, the polymer blend may have a tensile strength at break greater than or equal to 3 MPa, greater than or equal to 5 MPa, or even greater than or equal to 10 MPa. In embodiments, the polymer blend may have a tensile strength at break less than or equal to 35 MPa, less than or equal to 25 MPa, or even less than or equal to 20 MPa. In embodiments, the polymer blend may have a tensile strength at break from 3 MPa to 35 MPa, from 3 MPa to 25 MPa, from 3 MPa to 20 MPa, from 5 MPa to 35 MPa, from 5 MPa to 25 MPa, from 5 MPa to 20 MPa, from 10 MPa to 35 MPa, from 10 MPa to 25 MPa, or even from 10 MPa to 20 MPa, or any and all sub-ranges formed from any of these endpoints.

Additives

In embodiments, the polymer blend may further comprise an additive. The additive can be used in any amount that is sufficient to obtain a desired processing or performance property for the polymer blend and/or the electronic devices including the housing made therefrom. The amount should not be wasteful of the additive nor detrimental to the processing or performance of the polymer blend and/or the electronic devices including the housing made therefrom.

In embodiments, the additive may comprise glass beads; plasticizers; anti-blocking agents; stabilizers; adhesion promoters; anti-fogging agents; antioxidants; anti-static agents;

biocides (antibacterials, fungicides, and mildewcides); colorants including pigments and dyes; dispersants; fillers and extenders; fire and flame retardants and smoke suppressants; hardness adjusters; impact modifiers; initiators; lubricants; micas; mold release agents; processing aids; silanes, titanates and zirconates; stearates; ultraviolet light absorbers; viscosity regulators; or combinations thereof.

In embodiments, the polymer blend may further comprise hollow glass beads. While not wishing to be bound by theory, it is believed that the inclusion of hollow glass beads may further reduce the Dk of the polymer blend.

In embodiments, the amount of hollow glass beads in the polymer blend may be less than or equal to 30 wt %, less than or equal to 25 wt %, less than or equal to 20 wt %, less than or equal to 15 wt %, less than or equal to 12 wt %, less than or equal to 10 wt %, or even less than or equal to 7 wt %. In embodiments, the amount of hollow glass beads in the polymer blend may be greater than or equal to 0 wt %, greater than or equal to 1 wt %, greater than or equal to 2 wt %, or even greater than or equal to 5 wt %. In embodiments, the amount of hollow glass beads in the polymer blend may be from 0 wt % to 30 wt %, from 0 wt % to 25 wt %, from 0 wt % to 20 wt %, from 0 wt % to 15 wt %, from 0 wt % to 12 wt %, from 0 wt % to 10 wt %, from 0 wt % to 7 wt %, from 1 wt % to 30 wt %, from 1 wt % to 25 wt %, from 1 wt % to 20 wt %, from 1 wt % to 15 wt %, from 1 wt % to 12 wt %, from 1 wt % to 10 wt %, from 1 wt % to 7 wt %, from 2 wt % to 30 wt %, from 2 wt % to 25 wt %, from 2 wt % to 20 wt %, from 2 wt % to 15 wt %, from 2 wt % to 12 wt %, from 2 wt % to 10 wt %, from 2 wt % to 7 wt %, from 5 wt % to 30 wt %, from 5 wt % to 25 wt %, from 5 wt % to 20 wt %, from 5 wt % to 15 wt %, from 5 wt % to 12 wt %, from 5 wt % to 10 wt %, or even from 5 wt % to 7 wt %, or any and all sub-ranges formed from any of these endpoints.

Suitable commercial embodiments of hollow glass beads are available under the 3M brand from 3M Company, such as iM30K and iM16K.

In embodiments, the polymer blend may further comprise a plasticizer. The plasticizer may be used, for example, to adjust softness and/or improve flow or other properties of the polymer blend. In embodiments, the plasticizer may comprise mineral oil, vegetable oil, synthetic oil, or combinations thereof.

In embodiments, the amount of plasticizer in the polymer blend may be less than or equal to 20 wt %, less than or equal to 15 wt %, less than or equal to 12 wt %, less than or equal to 10 wt %, or even less than or equal to 7 wt %. In embodiments, the amount of plasticizer in the polymer blend may be greater than or equal to 0 wt %, greater than or equal to 1 wt %, greater than or equal to 2 wt %, or even greater than or equal to 5 wt %. In embodiments, the amount of the plasticizer in the polymer blend may be from 0 wt % to 20 wt %, from 0 wt % to 15 wt %, from 0 wt % to 12 wt %, from 0 wt % to 10 wt %, from 0 wt % to 7 wt %, from 1 wt % to 20 wt %, from 1 wt % to 15 wt %, from 1 wt % to 12 wt %, from 1 wt % to 10 wt %, from 1 wt % to 7 wt %, from 2 wt % to 20 wt %, from 2 wt % to 15 wt %, from 2 wt % to 12 wt %, from 2 wt % to 10 wt %, from 2 wt % to 7 wt %, from 5 wt % to 20 wt %, from 5 wt % to 15 wt %, from 5 wt % to 12 wt %, from 5 wt % to 10 wt %, or even from 5 wt % to 7 wt %, or any and all sub-ranges formed from any of these endpoints.

Suitable commercial embodiments of the plasticizer are available under the PURETOL 380 brand from Petro-Canada, and those available under the PRIMOL 382 brand from ExxonMobil.

In embodiments, the polymer blend may further comprise a anti-blocking agent. In embodiments, the amount of anti-blocking agent in the polymer blend may be less than or equal to 5 wt %, less than or equal to 4 wt %, less than or equal to 3 wt %, less than or equal to 2 wt %, or even less than or equal to 1 wt %. In embodiments, the amount of anti-blocking agent in the polymer blend may be greater than or equal to 0 wt %, greater than or equal to 0.001 wt %, or even greater than or equal to 0.01 wt %. In embodiments, the amount of anti-blocking agent in the polymer blend may be from 0 wt % to 5 wt %, from 0 wt % to 4 wt %, from 0 wt % to 3 wt %, from 0 wt % to 2 wt %, from 0 wt % to 1 wt %, from 0.001 wt % to 5 wt %, from 0.001 wt % to 4 wt %, from 0.001 wt % to 3 wt %, from 0.001 wt % to 2 wt %, from 0.001 wt % to 1 wt %, from 0.01 wt % to 5 wt %, from 0.01 wt % to 4 wt %, from 0.01 wt % to 3 wt %, from 0.01 wt % to 2 wt %, or even from 0.01 wt % to 1 wt %, or any and all sub-ranges formed from any of these endpoints.

Suitable commercial embodiments of anti-blocking agent are available from Kemamide B.

In embodiments, the polymer blend may further comprise a stabilizer. In embodiments, the amount of stabilizer in the polymer blend may be less than or equal to 5 wt %, less than or equal to 4 wt %, less than or equal to 3 wt %, less than or equal to 2 wt %, or even less than or equal to 1 wt %. In embodiments, the amount of stabilizer in the polymer blend may be greater than or equal to 0 wt %, greater than or equal to 0.001 wt %, or even greater than or equal to 0.01 wt %. In embodiments, the amount of stabilizer in the polymer blend may be from 0 wt % to 5 wt %, from 0 wt % to 4 wt %, from 0 wt % to 3 wt %, from 0 wt % to 2 wt %, from 0 wt % to 1 wt %, from 0.001 wt % to 5 wt %, from 0.001 wt % to 4 wt %, from 0.001 wt % to 3 wt %, from 0.001 wt % to 2 wt %, from 0.001 wt % to 1 wt %, from 0.01 wt % to 5 wt %, from 0.01 wt % to 4 wt %, from 0.01 wt % to 3 wt %, from 0.01 wt % to 2 wt %, or even from 0.01 wt % to 1 wt %, or any and all sub-ranges formed from any of these endpoints.

Suitable commercial embodiments of stabilizer are available under the IRGANOX brand from BASF.

Processing

In embodiments, the polymer blend described herein may be made with batch process or continuous process.

In embodiments, the components of the polymer blend may be added all together in an extruder and mixed. In embodiments, mixing may be a continuous process at an elevated temperature (e.g., 120° C.-250° C.) that is sufficient to melt the polymer matrix. In embodiments, fillers may be added at the feed-throat, or by injection or side-feeders downstream. In embodiments, the output from the extruder is pelletized for later extrusion, molding, thermoforming, foaming, calendaring, and/or other processing into polymeric articles.

Electronic Devices

As described herein, the polymer blends can be useful for making any type of electronic devices transmitting and/or receiving high frequency, for which properties such as low dielectric constant and sufficient hardness and tensile strength are desirable or required. In embodiments, the polymer blends may be useful for making a housing included in any type of electronic device transmitting and/or receiving signals greater than or equal to 2.5 GHz. In embodiments, the electronic devices may transmit and/or receive signals less than 50 GHz, less than 40 GHz, or even less than 30 GHz. In embodiments, the electronic devices may transmit and/or receive signals greater than 2.5 GHz, greater than or equal to 4 GHz, greater than or equal to 10

GHz, greater than or equal to 15 GHz, or even greater than or equal to 20 GHz. In embodiments, the electronic devices may transmit and/or receive signals from 2.5 GHz to 50 GHz, from 2.5 GHz to 40 GHz, from 2.5 GHz to 30 GHz, from 4 GHz to 50 GHz, from 4 GHz to 40 GHz, from 4 GHz to 30 GHz, from 10 GHz to 50 GHz, from 10 GHz to 40 GHz, from 10 GHz to 30 GHz, from 15 GHz to 50 GHz, from 15 GHz to 40 GHz, from 15 GHz to 30 GHz, from 20 GHz to 50 GHz, from 20 GHz to 40 GHz, or even from 20 GHz to 30 GHz, or any and all sub-ranges formed from any of these endpoints. In embodiments, the electronic devices may transmit and/or receive signals from 2.5 to 4 GHz. In embodiments, the electronic devices may transmit and/or receive signals from 20 to 40 GHz.

The term "housing" described herein, refers to a structure that encloses one or more components of electronic devices transmitting and/or receiving signals greater than or equal to 2.5 GHz.

The polymer blends have potential for use in applications in many different industries, including but not limited to: automotive and transportation; consumer products; electronics; healthcare and medical; household appliances; and other industries or applications benefiting from the unique combination of properties.

In embodiments, the polymer blends may be especially useful for making protective cases for a personal electronic device (e.g., smart phones, tablets, and handheld computers), a grip, a gasket, or combinations thereof.

EXAMPLES

Examples 1-21

Table 1 shows sources of ingredients for the polymer blends of Examples 1-21.

TABLE 1

| Ingredient | Brand | Source |
|---|---|---|
| aromatic polyether TPU | Irogran A85P 4394UV | Huntsman Corporation |
| SEBS | Kraton A1535 | Kraton Polymers |
| SEBS | Kraton FG1901 | Kraton Polymers |
| SEEPS | Septon 4055 | Kuraray |
| SEEPS | Septon 4044 | Kuraray |
| Mineral oil | Puretol 380 | Petro-Canada |
| Anti-block agent | Kemamide B | PMC Biogenix |
| Stabilizer | Irganox 1010 | BASF |
| Hollow Glass beads | iM30K | 3M |
| Hollow Glass beads | iM16K | 3M |

Table 2 shows the formulations (in parts and wt %) and certain properties of Examples 1-21.

TABLE 2

| | Examples | | | | | |
|---|---|---|---|---|---|---|
| | 1 | | 2 | | 3 | |
| | parts | wt % | parts | wt % | parts | wt % |
| Kraton A1535 | 40 | 6.13 | 40 | 5.76 | 40 | 5.57 |
| Puretol 380 | 26 | 3.98 | 26 | 3.74 | 26 | 3.62 |
| Irogran A85P 4394UV | 584 | 89.43 | 584 | 84.03 | 584 | 81.34 |
| Kemamide B | 2 | 0.31 | 2 | 0.29 | 2 | 0.28 |
| Irganox 1010 | 1 | 0.15 | 1 | 0.14 | 1 | 0.14 |
| 3M: iM30K | 0 | 0.00 | 42 | 6.04 | 65 | 9.05 |
| Total | 653 | 100 | 695 | 100 | 718 | 100 |
| Hardness, A | 82 | | 83 | | 84 | |
| Specific Gravity | 1.071 | | 1.025 | | 1.008 | |
| Dk @ 2.5 GHz | 3.012 | | 2.900 | | 2.865 | |
| Df @ 2.5 GHz | 0.0832 | | 0.0761 | | 0.0734 | |

| | Examples | | | | | |
|---|---|---|---|---|---|---|
| | 4 | | 5 | | 6 | |
| | parts | wt % | parts | wt % | parts | wt % |
| Kraton A1535 | 40 | 5.38 | 40 | 5.21 | 40 | 5.02 |
| Puretol 380 | 26 | 3.50 | 26 | 3.39 | 26 | 3.26 |
| Irogran A85P 4394UV | 584 | 78.60 | 584 | 76.04 | 584 | 73.27 |
| Kemamide B | 2 | 0.27 | 2 | 0.26 | 2 | 0.25 |
| Irganox 1010 | 1 | 0.13 | 1 | 0.13 | 1 | 0.13 |
| 3M: iM30K | 90 | 12.11 | 115 | 14.97 | 144 | 18.07 |
| Total | 743 | 100 | 768 | 100 | 797 | 100 |
| Hardness, A | 85 | | 85 | | 86 | |
| Specific Gravity | 0.976 | | 0.954 | | 0.934 | |
| Dk @ 2.5 GHz | 2.771 | | 2.703 | | 2.660 | |
| Df @ 2.5 GHz | 0.0689 | | 0.0645 | | 0.0627 | |

TABLE 2-continued

| | Examples | | | | | | | | | |
|---|---|---|---|---|---|---|---|---|---|---|
| | 7 | | 8 | | 9 | | 10 | | 11 | |
| | parts | wt % | parts | wt % | parts | wt % | parts | wt % | parts | wt % |
| Kraton A1535 | 40 | 5.76 | 40 | 5.57 | 40 | 5.38 | 40 | 5.21 | 40 | 5.02 |
| Puretol 380 | 26 | 3.74 | 26 | 3.62 | 26 | 3.50 | 26 | 3.39 | 26 | 3.26 |
| Irogran A85P 4394UV | 584 | 84.03 | 584 | 81.34 | 584 | 78.60 | 584 | 76.04 | 584 | 73.27 |
| Kemamide B | 2 | 0.29 | 2 | 0.28 | 2 | 0.27 | 2 | 0.26 | 2 | 0.25 |
| Irganox 1010 | 1 | 0.14 | 1 | 0.14 | 1 | 0.13 | 1 | 0.13 | 1 | 0.13 |
| 3M: iM16K | 42 | 6.04 | 65 | 9.05 | 90 | 12.11 | 115 | 14.97 | 144 | 18.07 |
| Total | 695 | 100 | 718 | 100 | 743 | 100 | 768 | 100 | 797 | 100 |
| Hardness, A | 82 | | 83 | | 84 | | 85 | | 86 | |
| Specific Gravity | 0.983 | | 0.952 | | 0.927 | | 0.906 | | 0.886 | |
| Dk @ 2.5 GHz | 2.788 | | 2.718 | | 2.673 | | 2.611 | | 2.572 | |
| Df @ 2.5 GHz | 0.069 | | 0.0665 | | 0.0656 | | 0.0625 | | 0.0621 | |

| | Examples | | | | | |
|---|---|---|---|---|---|---|
| | 12 | | 13 | | 14 | |
| | parts | wt % | parts | wt % | parts | wt % |
| Kraton A1535 | 40 | 6.13 | 40 | 5.76 | 40 | 5.57 |
| Septon 4055 | 13 | 10.31 | 13 | 9.99 | 13 | 9.38 |
| Septon 4044 | 6 | 4.76 | 6 | 4.61 | 6 | 4.33 |
| Puretol 380 | 22.5 | 17.84 | 22.5 | 17.29 | 22.5 | 16.23 |
| Kraton FG1901 | 4 | 3.17 | 0 | 0 | 4 | 2.89 |
| Irogran A85P 4394UV | 80 | 63.44 | 80 | 61.49 | 80 | 57.72 |
| Kemamide B | 0.4 | 0.32 | 0.4 | 0.31 | 0.4 | 0.29 |
| Irganox 1010 | 0.2 | 0.16 | 0.2 | 0.15 | 0.2 | 0.14 |
| 3M: iM30K | 0 | 0.00 | 8 | 6.15 | 12.5 | 9.02 |
| Total | 126.1 | 100 | 130.1 | 100 | 138.6 | 100 |
| Hardness, A | 66 | | 69 | | 71 | |
| Specific Gravity | 1.005 | | 0.964 | | 0.953 | |
| Dk @ 2.5 GHz | 2.775 | | 2.671 | | 2.651 | |
| Df @ 2.5 GHz | 0.0618 | | 0.0570 | | 0.0570 | |

| | Examples | | | | | |
|---|---|---|---|---|---|---|
| | 15 | | 16 | | 17 | |
| | parts | wt % | parts | wt % | parts | wt % |
| Kraton A1535 | 40 | 5.38 | 40 | 5.21 | 40 | 5.02 |
| Septon 4055 | 13 | 9.05 | 13 | 8.78 | 13 | 8.46 |
| Septon 4044 | 6 | 4.18 | 6 | 4.05 | 6 | 3.91 |
| Puretol 380 | 22.5 | 15.67 | 22.5 | 15.19 | 22.5 | 14.65 |
| Kraton FG1901 | 4 | 2.79 | 4 | 2.70 | 4 | 2.60 |
| Irogran A85P 4394UV | 80 | 55.71 | 80 | 54.02 | 80 | 52.08 |
| Kemamide B | 0.4 | 0.28 | 0.4 | 0.27 | 0.4 | 0.26 |
| Irganox 1010 | 0.2 | 0.14 | 0.2 | 0.14 | 0.2 | 0.13 |
| 3M: iM30K | 17.5 | 12.19 | 22 | 14.85 | 27.5 | 17.90 |
| Total | 143.6 | 100 | 148.1 | 100 | 153.6 | 100 |
| Hardness, A | 72 | | 72 | | 72 | |
| Specific Gravity | 0.942 | | 0.928 | | 0.913 | |
| Dk @ 2.5 GHz | 2.636 | | 2.595 | | 2.571 | |
| Df @ 2.5 GHz | 0.0561 | | 0.0541 | | 0.0530 | |

| | Examples | | | | | | | |
|---|---|---|---|---|---|---|---|---|
| | 18 | | 19 | | 20 | | 21 | |
| | parts | wt % | parts | wt % | parts | wt % | parts | wt % |
| Septon 4055 | 13 | 9.69 | 13 | 9.38 | 13 | 9.05 | 13 | 8.78 |
| Septon 4044 | 6 | 4.47 | 6 | 4.33 | 6 | 4.18 | 6 | 4.05 |
| Puretol 380 | 22.5 | 16.78 | 22.5 | 16.23 | 22.5 | 15.67 | 22.5 | 15.19 |
| Kraton FG1901 | 4 | 2.98 | 4 | 2.89 | 4 | 2.79 | 4 | 2.70 |
| Irogran A85P 4394UV | 80 | 59.66 | 80 | 57.72 | 80 | 55.71 | 80 | 54.02 |

TABLE 2-continued

| | | | | | | | | |
|---|---|---|---|---|---|---|---|---|
| Kemamide B | 0.4 | 0.30 | 0.4 | 0.29 | 0.4 | 0.28 | 0.4 | 0.27 |
| Irganox 1010 | 0.2 | 0.15 | 0.2 | 0.14 | 0.2 | 0.14 | 0.2 | 0.14 |
| 3M: iM16K | 8 | 5.97 | 12.5 | 9.02 | 17.5 | 12.19 | 22 | 14.85 |
| Total | 134.1 | 100 | 138.6 | 100 | 143.6 | 100 | 148.1 | 100 |
| Hardness, A | 71 | | 73 | | 74 | | 75 | |
| Specific Gravity | 0.961 | | 0.926 | | 0.912 | | 0.889 | |
| Dk @ 2.5 GHz | 2.683 | | 2.631 | | 2.592 | | 2.553 | |
| Df @ 2.5 GHz | 0.0579 | | 0.0584 | | 0.0573 | | 0.0559 | |

Comparative Examples 1-3

Table 3 shows sources of ingredients for the polymer blends of Comparative Examples 1-3.

TABLE 3

| Ingredient | Brand | Source |
|---|---|---|
| aromatic polyether TPU | Irogran A85P 4394UV | Huntsman Corporation |
| Polyester-type TPU | Elastollan S85A 55N | BASF |
| SEBS | Septon 4055 | Kuraray |
| Homo-PP | Profax 702 | Lyonda Basell |
| Mineral oil | Puretol 380 | Petro-Canada |
| Calcium carbonate filler | Vicron 25-11 | SPECIALTY MINERALS |
| TPV | Santoprene | ExxonMobil Chemical |

Table 4 shows the formulations (in parts and wt %) and certain properties (Dk of aromatic polyether TPU, and Df of aromatic polyether TPU) of Comparative Examples 1-3.

TABLE 4

| Comparative Examples | 1 | 2 | 3 |
|---|---|---|---|
| Irogran A85P 4394UV (wt %) | 100 | — | — |
| Elastollan S85A55N (wt %) | — | 58 | — |
| Septon 4055 (wt %) | — | 14 | 13 |
| Profax 702 (wt %) | — | — | 20 |
| Puretol 380 (wt %) | — | 13 | 35 |
| Vicron 25-11 (wt %) | — | 11 | — |
| Santoprene TPV (wt %) | — | 4 | 32 |
| Total | 100 | 100 | 100 |
| Hardness | 85 | — | — |
| Specific Gravity | 1.12 | — | — |
| Dk @ 2.5 GHz | 3.119 | — | — |
| Df@ 2.5 GHz | 0.0899 | — | — |

Evaluating Dielectric Constant

As shown in Table 2, Examples 1-21, polymer blends including aromatic polyether TPU and a SBC, had a reduced Dk value while maintaining or only insignificantly decreasing Shore A hardness as compared to Comparative Example 1, 100% aromatic polyether TPU. As indicated by the Examples shown in Table 2, including a dielectric constant modifier reduces the Dk, thereby minimizing degradation of high frequency, while maintaining Shore A hardness as compared to an aromatic polyether TPU alone.

As further shown in Table 2, the Dk of the exemplary polymer blends decreased as the amount of hollow glass beads increased. As indicated by the examples in Table 2, hollow glass beads may be added in certain amounts to achieve a desired Dk.

Evaluating Average Signal Degradation

Example 12 and Comparative Examples 1-3 were prepared by compounding the ingredients together using a twin screw extruder at a mixing temperature of 180° C. and a mixing speed of 300 rpm to provide extruded pellets (except that Comparative Example 1 which is a neat TPU was not compounded). For the Example and Comparative Examples, pellets were injection molded into plaques having a thickness of 1.5 mm, which were used for testing average signal degradation. 28 GHz of signal was provided to test average signal degradation, the results of which are shown in Table 5.

TABLE 5

| | Example 12 | Comparative Example 1 | Comparative Example 2 | Comparative Example 3 |
|---|---|---|---|---|
| 5G 28 GHz average signal degradation, dB | −0.55 | −1.2 | −1.4 | −0.45 |
| Hardness | 66 | 85 | 66 | 70 |
| Tensile Strength | 10.3 MPa | 20.7 MPa | 10.3 MPa | 4.8 MPa |

As shown in Table 5, Example 12, a polymer blend including aromatic polyether TPU and a SBC, minimized the signal degradation as compared to Comparative Example 1, 100% aromatic polyether TPU, and Comparative Example 2, a polymer blend of polyester-type TPU and a SBC. While Comparative Example 3, a polymer blend of a SBC and a homopolypropylene, minimized the signal degradation as compared to Comparative Examples 1 and 2, Comparative Example 3 had a reduced hardness and tensile strength below a desired value. As indicated by Example 12 and Comparative Examples 1-3, including the dielectric constant modifier minimizes the degradation of high frequency while maintaining or only insignificantly decreasing hardness or tensile strength such that polymer blends described herein may be suitable for use in electronic devices transmitting and/or receiving high frequency.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. An electronic device comprising:
   a housing comprising a polymer blend, the polymer blend comprising:
   45 weight percent (wt %) to 95 wt % of at least one of an aromatic polyether thermoplastic polyurethane (TPU) and a copolyester elastomer (COPE); and
   1 wt % to 35 wt % of a dielectric constant modifier comprising at least one of a polyolefin and a block copolymer comprising at least one polyolefin block,
   wherein the electronic device is configured to receive signals greater than or equal to 2.5 Gigahertz (GHz).

2. The electronic device of claim 1, wherein the polymer blend comprises the aromatic polyether TPU.

3. The electronic device of claim 1, wherein the aromatic polyether TPU comprises a dielectric constant (Dk) of less than or equal to 3.25 as measured in accordance with a resonant cavity method with a frequency of 2.5 GHz.

4. The electronic device of claim 1, wherein the dielectric constant modifier further comprises a polyolefin elastomer, a thermoplastic vulcanizate (TPV), or combinations thereof.

5. The electronic device of claim 1, wherein the block copolymer comprises a styrene-butadiene block copolymer (SBC).

6. The electronic device of claim 5, wherein the SBC comprises a styrene-ethylene/butylene-styrene block copolymer (SEBS), a styrene-(ethylene/propylene)-styrene block copolymer (SEEPS), a styrene isoprene block copolymer (SIS), a styrene-isobutylene-styrene block copolymer (SIBS), or combinations thereof.

7. The electronic device of claim 5, wherein the SBC comprises a Dk of less than or equal to 3.0 as measured in accordance with a resonant cavity method with a frequency of 2.5 GHz.

8. The electronic device of claim 1, wherein the polyolefin comprises at least one of a polypropylene (PP) and a polyethylene (PE).

9. The electronic device of claim 1, wherein the polymer blend further comprises 5 wt % to 30 wt % of hollow glass beads.

10. The electronic device of claim 1, wherein the polymer blend further comprises 1 wt % to 20 wt % of a plasticizer.

11. The electronic device of claim 1, wherein the polymer blend further comprises 0.01 wt % to 1 wt % of an anti-blocking agent.

12. The electronic device of claim 1, wherein the polymer blend further comprises 0.01 wt % to 1 wt % of a stabilizer.

13. The electronic device of claim 1, wherein the electronic device comprises a protective case for a personal electronic device, a grip, a gasket, or combinations thereof.

14. The electronic device of claim 1, wherein the aromatic polyether TPU, the COPE, the dielectric constant modifier, or combinations thereof comes from a recycled source.

15. The electronic device of claim 1, wherein the housing is a protective case for a personal electronic device.

16. The electronic device of claim 1, wherein the electronic device is configured to receive 5G signals.

* * * * *